United States Patent [19]

Ashbolt et al.

[11] Patent Number: 4,815,348
[45] Date of Patent: Mar. 28, 1989

[54] APPARATUS FOR TRIMMING A FLANGED END OF A TUBULAR ARTICLE

[75] Inventors: Mark T. Ashbolt, Crawley; Martin J. Watson, Wantage, both of United Kingdom; Thomas G. Mann, deceased, late of Wantage, United Kingdom, by Jean Mann, executrix

[73] Assignee: Metal Box p.l.c., Reading, United Kingdom

[21] Appl. No.: 93,563

[22] PCT Filed: Nov. 10, 1986

[86] PCT No.: PCT/GB86/00695
§ 371 Date: Jul. 10, 1987
§ 102(e) Date: Jul. 10, 1987

[87] PCT Pub. No.: WO87/02919
PCT Pub. Date: May 21, 1987

[30] Foreign Application Priority Data

Nov. 14, 1985 [GB] United Kingdom ............... 8528119

[51] Int. Cl.⁴ .............................. B26D 7/01
[52] U.S. Cl. ........................... 83/383; 83/140; 83/456; 83/563; 83/564; 83/690; 83/914
[58] Field of Search ............. 83/54, 140, 188–192, 83/637, 821, 823, 685, 686, 690, 698, 914, 564, 456, 563

[56] References Cited

U.S. PATENT DOCUMENTS

| | | | |
|---|---|---|---|
| 2,023,200 | 12/1935 | Huff et al. | 83/189 |
| 3,465,931 | 9/1969 | Rupert | 83/914 |
| 3,863,529 | 2/1975 | Bolen | 82/47 |
| 3,911,556 | 10/1975 | Pierce | 83/914 |
| 3,933,071 | 1/1976 | Doring | 83/637 |
| 3,971,275 | 7/1976 | Mach | 83/140 |

FOREIGN PATENT DOCUMENTS

2354402 1/1975 Fed. Rep. of Germany .
1508782 4/1978 United Kingdom .

Primary Examiner—Frank T. Yost
Assistant Examiner—Hien H. Phan
Attorney, Agent, or Firm—Burns, Doane, Swecker & Mathis

[57] ABSTRACT

A punch and die assembly for trimming the flared end of a can body comprises a reciprocable punch (10), and a split die (15) consisting of two semi-circular segments (14, 16) movable between an open position allowing infeed of article (A), and a closed position around the article. During co-operation of the cutting edges (35, 61) and (51, 62) on the punch (10) and die (15) respectively to trim the can body, the punch is centralized accurately in relation to the die by engagement of a radially outwardly facing surface (521, 74) on the die with a radially inwardly facing surface (321, 73) on the punch; rough alignment between punch and die having previously been achieved by engagement of further surfaces on the punch and die when the die was closed.

9 Claims, 7 Drawing Sheets

APPARATUS FOR TRIMMING A FLANGED END OF A TUBULAR ARTICLE

The present invention relates generally to apparatus for trimming a flanged end of a tubular article and has particular, but not exclusive, application for trimming a flanged end of a plastics body for a food or beverage container, prior to double-seaming the flanged end to a metal end closure.

In order reliably to make an effective leak-proof double seam between the flanged end of a container body and an end closure, the flanged end must be provided with an accurately trimmed edge. Conventionally, the necessary degree of accuracy has been achieved by mounting a punch for vertical movement on the pillars of a standard pillar and die set. The punch is mounted on an upper beam which is reciprocated along two or more pillars toward and away from the die beneath it. To achieve the accurate alignment required between the punch and the die, a massive framework including the pillars is required to achieve sufficient rigidity for accurate alignment to be possible. However, these traditional pillar and die sets are extremely expensive; they are massive and access for the article is often restricted. One object of the present invention is to enable the required degree of accuracy to be provided for a flange trimming operation on a plastics container body without the need for the massive structure of the pillar and die sets which have been used hitherto.

For a tube having a flanged end to be correctly positioned in an annular die which must necessarily have a smaller internal diameter than the untrimmed flange, one of two conditions must be provided. Either there must be sufficient space provided in the apparatus for the tube to be fed axially into the die until the flange reaches the die, or the die must be formed in segments which are separable and movable between a closed position in which the die is formed, and an open position in which the segments are spaced from one another. The invention relates to apparatus of the second type.

Accordingly, the present invention provides apparatus for trimming a flanged end of a tubular article, comprising a punch and a die, the punch and the die being relatively movable along the axis of the article and on such relative movement cooperating to sever and thereby trim the flanged end of the article at a required diameter; the die being formed of a plurality of segments which are movable between a closed position in which the die is formed and an open position in which the segments are spaced from one another, and the apparatus including aligning means for the punch and die comprising a radially outwardly facing surface on the die and a radially inwardly facing surface carried by the punch, the two surfaces being brought into engagement by relative axial movement of the punch and die towards one another so as to hold the segments of the die securely together and retain the punch and die in correct alignment at least while the flanged end is being trimmed.

An advantageous feature of the split die arrangement of the described embodiments is the provision of further surfaces which are mutually engageable to provide a lateral alignment of the punch and die which is in addition to the alignment provided by the first-mentioned surfaces when the punch is operated. The further surfaces are brought into engagement when the die segments are moved from their open to their closed position and so provide a rough or initial alignment of the punch and die which is in advance of the alignment provided by the first-mentioned surfaces.

In accordance with one embodiment of the invention, the die segments are attached to respective pivotally mounted members so as to follow an arcuate path in moving between their open and closed positions, the said further surface of the die being provided by the said pivotally mounted members.

In a second embodiment, the die segments may be arranged to follow a linear path in moving between their open and closed positions.

In either case, the punch or the die may have an associated surface arranged to engage the article and to hold and locate the same for the said trimming operation.

Embodiments of the invention are described below, with reference to the accompanying drawings, in which.

Figure 1:
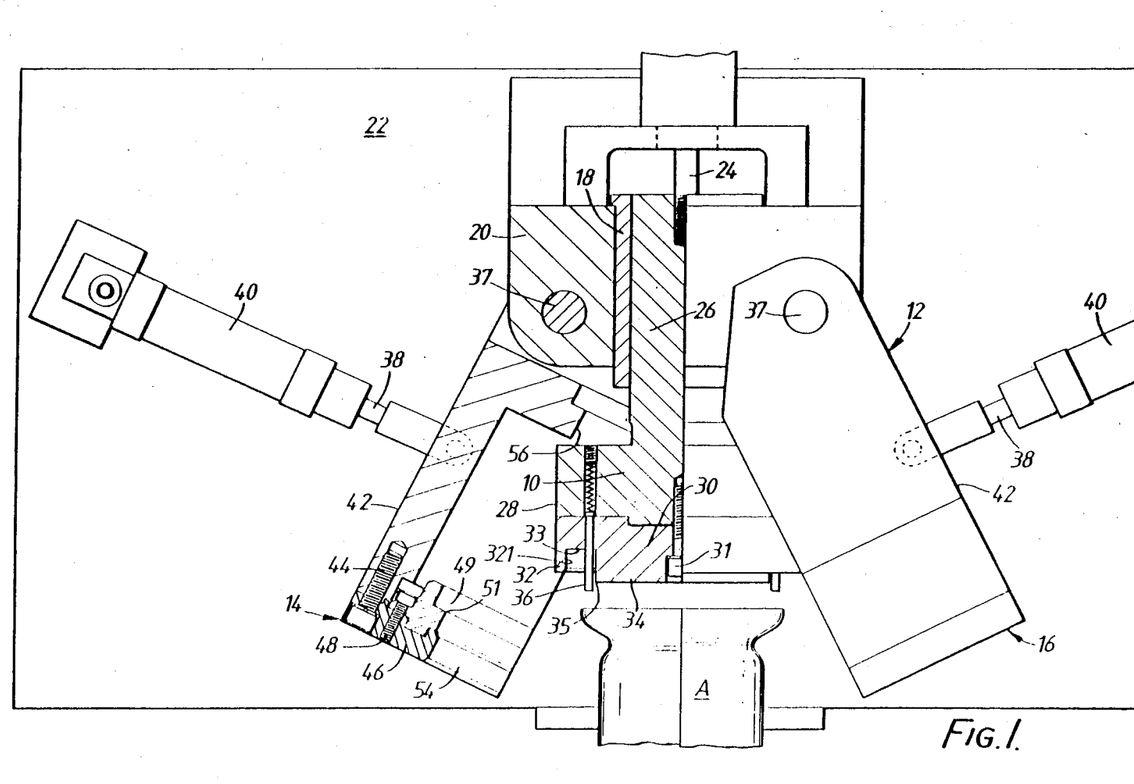
FIG. 1 illustrates apparatus according to the invention viewed from above and partially in horizontal section, with the die segments open at the start of a trimming operation of one end of a container body.
Figure 2:
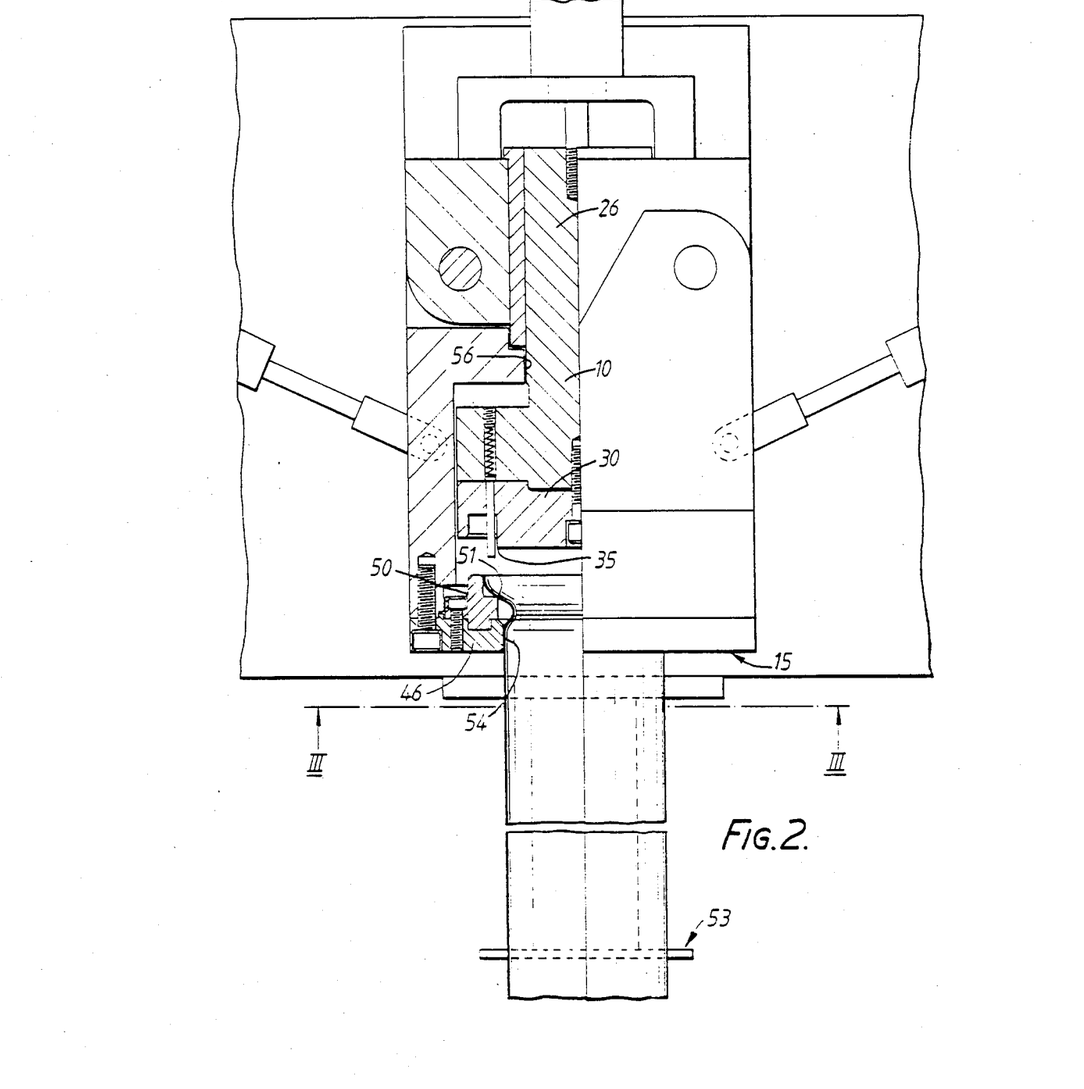
FIG. 2 illustrates the apparatus of FIG. 1, with the die segments closed around the container body to be trimmed.
Figure 3:
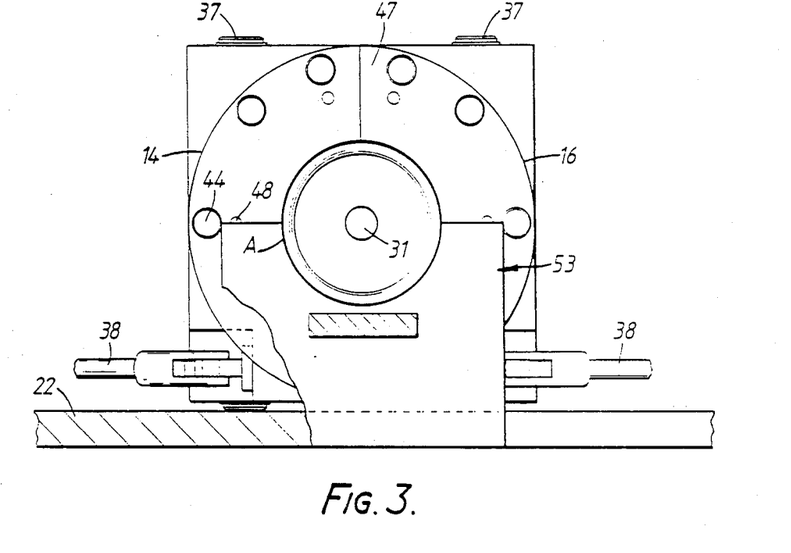
FIG. 3 shows an end elevation of the apparatus of FIGS. 1 and 2.

Referring to FIGS. 1 to 3 of the drawings, the apparatus is shown in relation to a article A in the form of a container body of polyethylene terephthalate (PET) having at least one end (as shown) necked-in and outwardly flared. The apparatus generally comprises a punch 10, and a split die assembly 12 having two identical half segments 14,16, of an annular die 15.

The punch 10 is mounted for reciprocal motion along its axis and is supported, via a cylindrical bearing sleeve 18, in a yoke 20 rigidly mounted on a base plate 22. The punch is reciprocated in any conventional manner by drive means which are not shown in the drawings but which could comprise, for example, an eccentric or a cam, or a pneumatically or hydraulically powered piston. The drive means act on a drive rod 24.

The punch 10 comprises a cylindrical shaft 26 which has an accurately machined surface which serves as the bearing surface not only for the bearing sleeve 18 but also for a further bearing member which will be described hereinbelow. Integral with the shaft 26 is an enlarged diameter portion 28 of the punch, to which a head 30 for the punch is releasably secured by means of a bolt 31. The punch head 30 is generally disc-shaped and has it leading face formed with a flat-bottomed annular channel 33 within a peripheral wall 32 which has a radially inwardly facing cylindrical surface 321. The channel 33 surrounds a central boss 34 of the punch head, the outer edge 35 of this boss providing the cutting edge 35 of the punch 10. Projecting axially of the punch head, out of its channel 33, is a plurality of outwardly biassed scrap-release pins 36. In a modification, the pins are replaced by a continuous annular scrap-release ring (not shown).

The die segments 14,16 are individually mounted for swinging movement in a horizontal plane about respective vertical shafts 37 which are mounted in the yoke 20. The die segments 14,16 can be swung between an open position (FIG. 1) and a closed position (FIG. 2) and are driven, via piston rods 38, by pneumatic or hydraulic cylinders 40.

Figure 4:
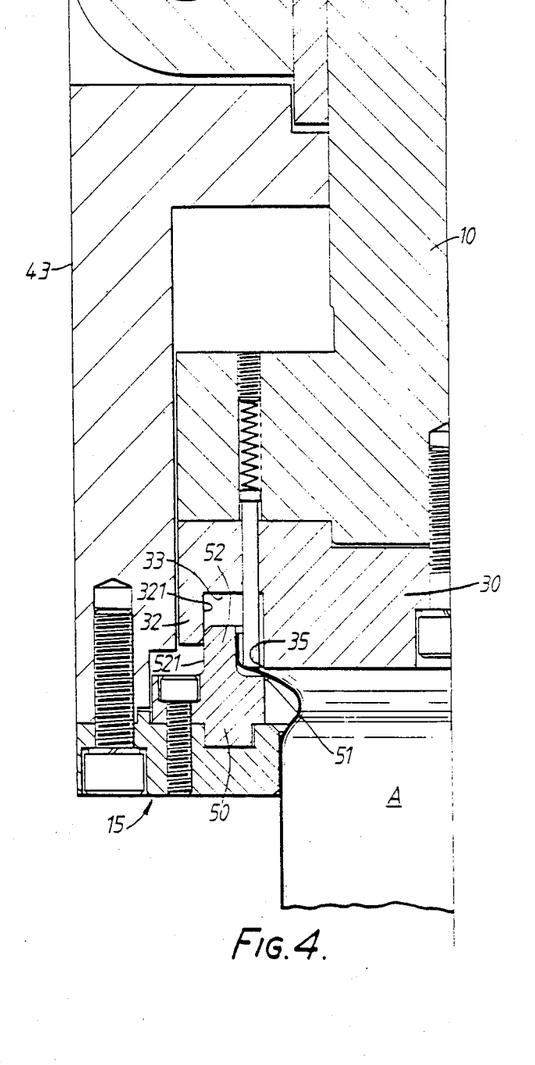
FIGS. 4 and 5 illustrate, on an enlarged scale, stages of the trimming operation, subsequent to the stages shown in FIGS. 1 and 2.

Each die segment is releasably mounted on a respective generally semi-cylindrical half portion 42 of a cylindrical body member 43 via bolts 44. It is comprised of a semi-circular half portion 46 of an end plate 47 and, releasably supported on the end plate portion 46 via bolts 48, a semi-circular portion 49 of a collecting ring 50. The collecting ring 50, formed by the two portions 49 when the die segments are in their closed position (see FIGS. 2 and 4), provides the cutting edge 51 of the die, for cutting co-operation with the cutting edge 35 of the punch. In addition, the collecting ring is formed with a collecting ridge 52 which provides a radially outwardly facing cylindrical surface 521.

The operation of the apparatus will now be described:

The apparatus is initially as shown in FIG. 1, with the die segments 14,16 in their open position and a article A having a flared end positioned between them. The article, suitably supported, is located in position by a cradle 53 (FIG. 2), and is inserted by the cradle sufficiently far into the apparatus so that the die segments can close around the flared end of the article.

In the second step of the operation, the die segments 14,16 are closed around the article A, moving into the position shown in FIG. 2. In this position, the die segments contact one another at their free ends to form a full annulus, the end plate 47 formed of the portions 46 then making contact with the cylindrical wall of the article A at a cylindrical inner face 54 so as to hold and laterally align the article ready for trimming. It will be seen that the engagement of the article by the face 54 occurs immediately beneath the neck of the article, and so is optimally effective for aligning the article for the trimming operation.

In the closed position of the die assembly, illustrated in FIG. 2, an internal cylindrical surface 56 formed adjacent that end of the body member 43 remote from the die 15 makes contact with the surface of the shaft 26 of the punch 10 behind the enlarged portion 28 and head 30 of the punch. By means of this contact, there is an initial alignment made between the punch 10 and the die assembly 12 prior to the operation of the punch. The body member 43 accordingly forms the second bearing member with which the shaft 26 co-operates, as mentioned above.

The next stage of the operation is to advance the punch 10 and thereby move the cutting edge 35 of the punch head 30 towards the cutting edge 51 on the collecting ring 50 of the die. However, before the cutting edges 35 and 51 can act on the article to sever the same, an alignment means between the punch head 30 and die 15 becomes operational. This alignment means comprises the engagement of the surface 321 on the wall 32 of the punch head 30 with the surface 521 on the ridge 52 on the collecting ring 50 of the die. The punch is advanced until it reaches the position shown in FIG. 4 where the wall 32 is collected by the ridge 52, that is to say, the surfaces 321 and 521 are engaged and thereafter constrained to slide over one another after any necessary lateral centralising movement of the punch 10 and die assembly 12 in relation to one another; by this means, the punch and die are further aligned to a higher degree of accuracy, the initial alignment having been made by contact between the cylindrical surfaces 56 and 26 as described above. It is to be noted that this alignment means is located in the immediate neighbourhood of the cut and formed by surfaces which are immovable in relation to the respective cutting edges 35,51 because they are carried integrally and in common by the collecting ring 50; the alignment means is therefore optimally effective to achieve accurate alignment of the cutting edges 35,51 in relation to one another.

A further function of the engagement of the ridge 52 on the die by the wall 32 of the punch is to hold the segments of the die securely together whilst severance is taking place. The die is thereby prevented from being expanded radially by any hoop stresses imposed on it.

Figure 5:
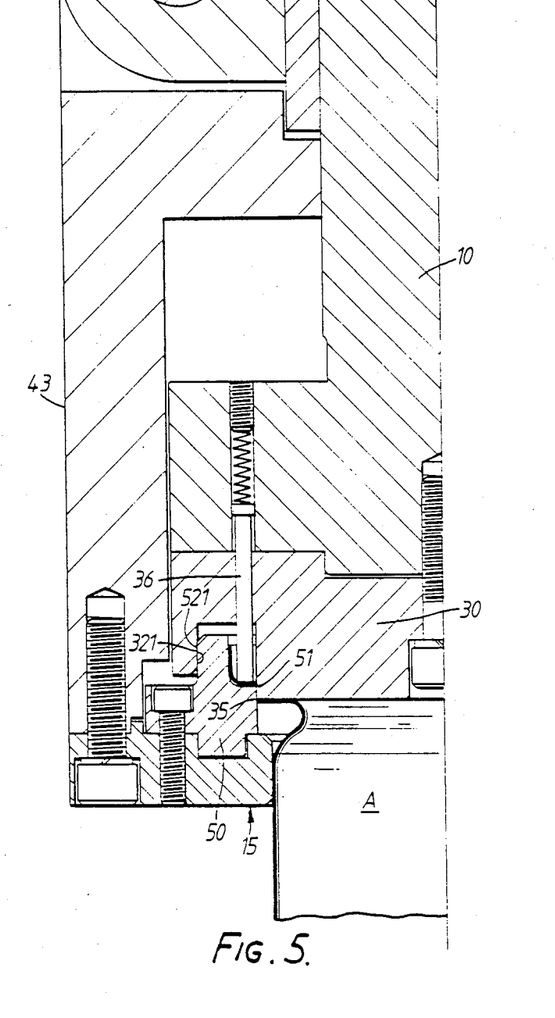

With accurate alignment achieved, the punch 10 is then further advanced towards the article A, the cutting edges 51 and 35 effecting an accurate trim on the flanged end region of the article. To ensure a complete trim, the punch head 30 is advanced beyond the cutting edge 51 on the collecting ring 50 into the position shown in FIG. 5, the over-travel involved being of the order of 2 mm. The punch 10 is then retracted and, during retraction, the spring-biassed scrap-removal pins 36 push away any scrap which may be adhering to the punch, the scrap being allowed to fall by gravity clear of the apparatus when the die assembly 12 opens. The article is finally removed from the apparatus.

Figures 6, 6A:
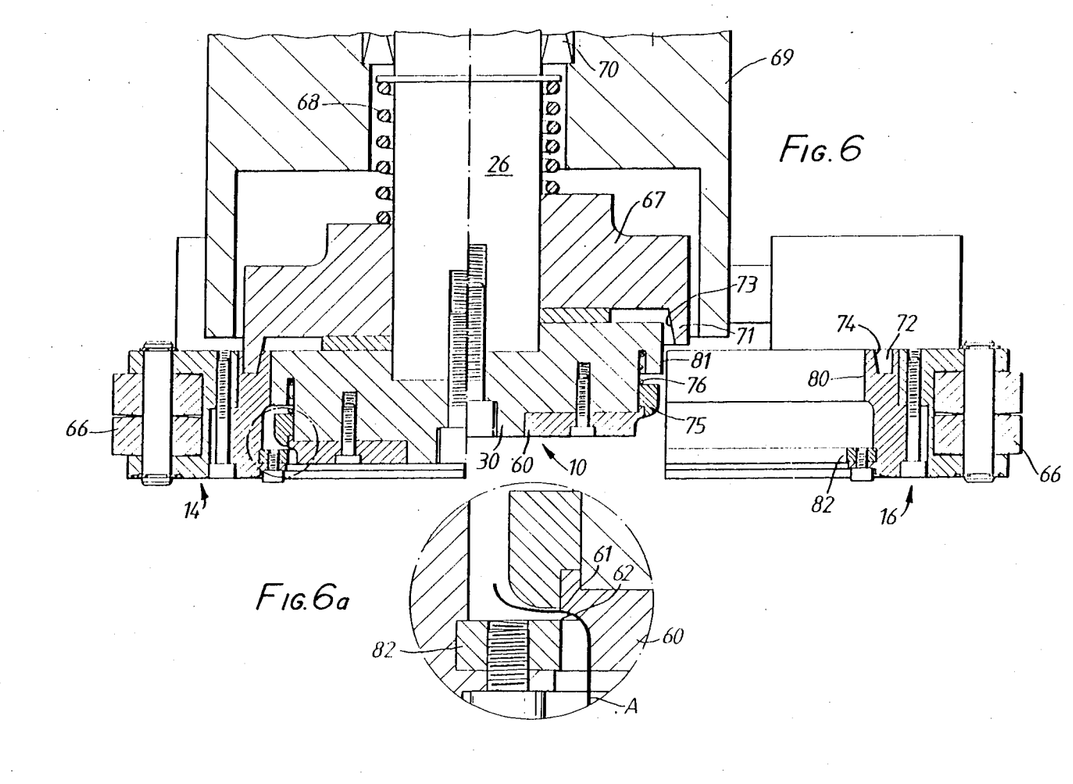
FIG. 6 illustrates an alternative embodiment of the apparatus shown in section and with opposite sides of the apparatus shown in different positions of operation.
FIG. 6a is an enlarged illustration of the circular portion of FIG. 6.
Figure 7:
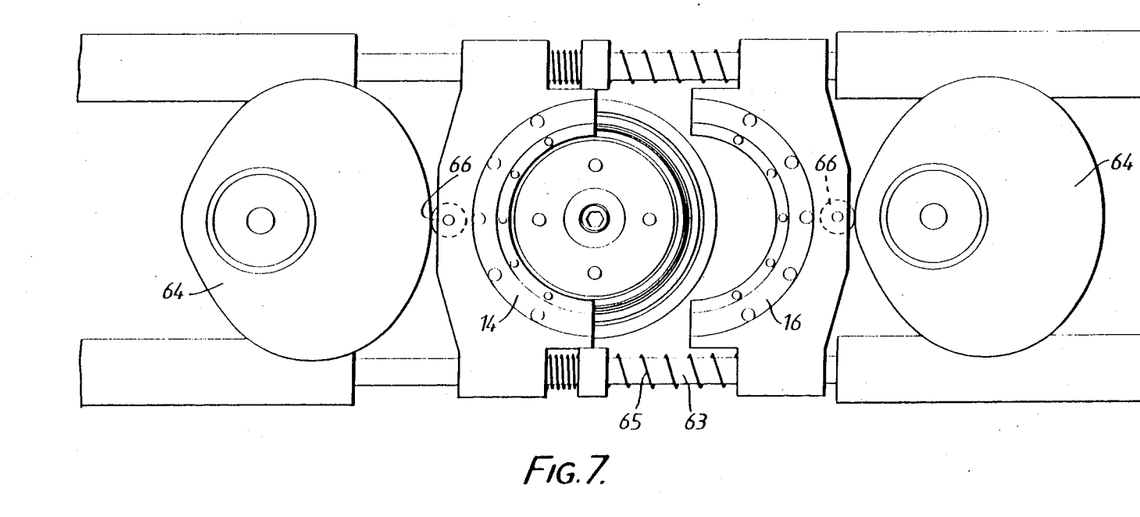
FIG. 7 is an end view of the apparatus of FIG. 6 additionally showing the mechanism for closing the die.

FIGS. 6, 6a and 7 show an alternative embodiment in which the die segments 14 and 16 move along a linear radial path between their open and closed positions. The punch 10 is, as before, supported on a cylindrical shaft 26 which is axially reciprocated by means not shown. The punch head 30 is bolted to the shaft 26 and has mounted thereon a cutting ring 60 contoured in accordance with the radially inner portion of the flanged end of the article to be trimmed and providing a cutting edge 61 which co-operates with a cutting edge 62 on the die to sever the flange of the article A. The two segments 14, 16 of the die are urged radially along guide bars 63 into their closed, die forming position, by means of cams 64 and against the action of springs 65. The surfaces of the cams bear on rollers 66 carried by the die segments.

A clamping ring 67 is mounted to slide on the shaft 26 and is urged towards the punch head 30 by means of a spring 68; the shaft 26 being journalled within a fixed housing 69 by means of bearings 70. The clamping ring 67 is provided with an annular extension 71 which engages in a corresponding groove 72 formed in the segments 14, 16 when the die is closed and the punch is advanced. By means of a radially inwardly facing frustoconical surface 73 on the extension 71 and a radially outwardly facing frustoconical surface 74 on the groove 72, the clamping ring holds the segments of the die securely together and retains the punch and die in correct alignment while the flanged end of the article A is being trimmed.

A flange support and ejection ring 75 is mounted for sliding movement on the punch head 30 under the action of a spring 76 and serves to support the radially outer portion of the flanged end of the article during the trimming operation. The cutting edges 61 and 62 co-operate to sever, and thus trim the flanged end at a required diameter which defines the radially inner and outer portions thereof.

The operation of this apparatus is as follows. With the die in its open position and with the punch retracted as shown on the right hand side of FIG. 6, the article is positioned axially in line with the punch. The punch is then advanced so that the punch head, and more particularly the cutting ring 60, locates in the open flanged end of the article. In timed relation, the two segments of the die are brought together under the action of the cams 64 until an internal cylindrical surface 80 on the die segments comes into sliding contact with an external cylindrical surface 81 on the punch head at the same time as the die segments come into contact with one another. At this stage there is an axial clearance between the clamping ring 67 and the die segments, but subsequent contined advance of the punch causes the annular extension 71 of the clamping ring to engage in the groove 72 on the die as explaned above. This position is shown in the left in FIG. 6.

Continued advance of the punch beyond the position shown on the left in FIG. 6 causes severance of the flanged end between the cutting edges 61 and 62 followed by rearward movement of the trimmed portion of the flanged end against spring 76 whilst held between the die segments and the support and ejection ring 75.

After the clamping ring 67 has fully engaged the die segments by means of extension 71 and groove 72, further advance of the punch causes the ring 67 to slip along the shaft 26 against the action of spring 68. Thus the die segments are held firmly together by the clamping ring 67 while the flanged end is being trimmed. After the two cutting edges 61 and 62 have passed one another sufficiently to ensure severance, the punch is retracted and the die segments are moved to their open position allowing the trimmed portion of the flanged end to be ejected from off the cutting ring 60 by the ring 75 and to drop out of the apparatus.

It should be noticed that the cutting edge 62 is provided on a cutting ring 82 which is formed in two segments and is replaceably mounted on the die. The cutting rings 60 and 82 can each be easily replaced when worn or damaged.

It will also be appreciated that the clamping ring 67 engages the shaft 26 over a substantial area and is thus accurately aligned coaxially therewith even though it can slide axially along the shaft.

Although the embodiments of FIGS. 1-5 and FIGS. 6 and 7 have been described in relation to dies movable along arcuate and linear paths respectively it will be appreciated that these and other details of construction could be interchangeably applied.

Various modifications of the apparatus as particularly described are possible. For instance, the split die could comprise more than two segments.

The various advantages of the apparatus described include its relative simplicity in providing accurate trimming without the need for a massive construction. Furthermore, the only components which are required to be machined to a high degree of accuracy are those which determine the final accuracy of alignment between the die and punch, and therefore of the cut which is achieved. These components are arranged to be readily replaceable either if they should become worn, or where a cut of greater or lesser diameter is required.

It will be understood that the described apparatus could be adapted to carry out trims on non-circular articles, such as those of oval or polygonal cross-section. In addition, it could be adapted for cutting plastics, metal, or other materials, the components being suited to the material involved.

We claim:

1. Apparatus for trimming a flanged end of a tubular article, comprising a punch and a die, the punch and the die being relatively movable along the axis of the article and on such relative movement cooperating to sever and thereby trim said flanged end of the article at a required diameter; the die being formed of a plurality of segments which are movable between a closed position in which the die is formed in surrounding relation with the article and an open position in which the segments are spaced from one another, and the apparatus including aligning means for the punch and die comprising a radially outwardly facing surface on the die and a radially inwardly facing surface carried by the punch, the radially outwardly facing surface on the die and the radially inwardly facing surface carried by the punch being brought into engagement by relative axial movement of the punch and die towards one another so as to urge the segments of the die radially inwardly into mutual die-forming relationship and furthermore retain the punch and die in correct alignment at least while the flanged end is being trimmed.

2. Apparatus according to claim 1, which includes further surfaces on the punch and the die which are mutually engageable to provide further relative lateral alignment of the punch and die, the further surfaces being brought into engagement when the die segments are moved from their open to their closed position.

3. Apparatus according to claim 1, wherein the die segments are attached to respective pivotally mounted members so as to follow an arcuate path in moving between their open and closed positions.

4. Apparatus according to claim 1, in which the die segments are mounted to follow a linear radial path in moving between their open and closed positions.

5. Apparatus according to claim 4, in which the die segments are moved towards their closed position by cams driven in timed relation to the punch.

6. Apparatus according to claim 1, wherein the die has an associated surface arranged so as, when the die segments are moved to their closed position, to engage the article externally and to hold and locate the same in relation to the die for the said severance operation.

7. Apparatus according to claim 1, wherein the punch has an associated surface arranged to engage the article internally and to hold and to locate the article in relation to the punch for the said severance operation.

8. Apparatus according to claim 1, in which the radially inwardly facing surface carried by the punch is provided on a clamping ring mounted for sliding movement on the shaft of the punch.

9. Apparatus according to claim 1, wherein the radially outwardly facing surface on the die is provided by an annular groove formed in the die.

* * * * *